US012187208B2

(12) United States Patent
Takahashi

(10) Patent No.: US 12,187,208 B2
(45) Date of Patent: Jan. 7, 2025

(54) POWER SUPPLY CONTROL DEVICE, CONTROL METHOD, AND STORAGE MEDIUM

(71) Applicant: TOYOTA JIDOSHA KABUSHIKI KAISHA, Toyota (JP)

(72) Inventor: Kensuke Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 18/299,122

(22) Filed: Apr. 12, 2023

(65) Prior Publication Data

US 2024/0001875 A1 Jan. 4, 2024

(30) Foreign Application Priority Data

Jun. 30, 2022 (JP) .................................. 2022-106285

(51) Int. Cl.
*B60R 16/033* (2006.01)
*H02J 9/06* (2006.01)

(52) U.S. Cl.
CPC ............ *B60R 16/033* (2013.01); *H02J 9/061* (2013.01); *H02J 2310/40* (2020.01)

(58) Field of Classification Search
CPC ...................................... B60R 16/03
See application file for complete search history.

(56) References Cited

U.S. PATENT DOCUMENTS

2016/0090052 A1* 3/2016 Nishijima ............... B60L 58/20
307/9.1
2017/0297433 A1* 10/2017 Shibachi ................ B60R 16/03
2023/0198290 A1* 6/2023 Kobayashi ............. B60L 58/14
307/23

FOREIGN PATENT DOCUMENTS

JP 2018-182935 A 11/2018
JP 2022-161163 A 10/2022

* cited by examiner

*Primary Examiner* — Daniel Kessie
(74) *Attorney, Agent, or Firm* — Oblon, McClelland, Maier & Neustadt, L.L.P.

(57) ABSTRACT

Provided is a power supply control device for a vehicle. The power supply control device is a device that controls power supply to a plurality of loads from a second power supply source provided for backup of a first power supply source. The power supply control device includes: a switching unit that switches between a first mode in which power of the second power supply source is supplied to a first load and not supplied to a second load, and a second mode in which the power of the second power supply source is supplied to the second load and not supplied to the first load; and a control unit that controls mode switching of the switching unit based on a state of the vehicle.

5 Claims, 3 Drawing Sheets

POWER SUPPLY CONTROL DEVICE, CONTROL METHOD, AND STORAGE MEDIUM

CROSS-REFERENCE TO RELATED APPLICATION

This application claims priority to Japanese Patent Application No. 2022-106285 filed on Jun. 30, 2022, incorporated herein by reference in its entirety.

BACKGROUND

1. Technical Field

The present disclosure relates to a vehicle power supply control device and the like that controls power supply from a power supply source to a plurality of loads.

2. Description of Related Art

Japanese Unexamined Patent Application Publication No. 2018-182935 (JP 2018-182935 A) discloses a power supply system that uses a power storage element made of a capacitor as a backup for a main power supply source to perform backup supply of power from the power storage element to the load in the event of a power failure such as a voltage loss of the main power supply source.

SUMMARY

When backup power supply is required for a plurality of loads at the same time, it is conceivable that inrush currents consumed by the actuators (ACT) provided for those loads overlap. If a large amount of current flows through the power supply line due to overlapping of inrush currents, a momentary voltage drop occurs due to the parasitic resistance of the capacitor and wiring resistance, which may hinder the operation of the backup power supply.

The present disclosure has been made in view of the above issue, and an object of the present disclosure is to provide a power supply control device and the like capable of suppressing overlapping of inrush currents consumed by loads in backup power supply.

In order to solve the above issue, an aspect of the technique of the present disclosure is a power supply control device for a vehicle. The power supply control device is a device that controls power supply to a plurality of loads from a second power supply source provided for backup of a first power supply source. The power supply control device includes: a switching unit that switches between a first mode in which power of the second power supply source is supplied to a first load and not supplied to a second load, and a second mode in which the power of the second power supply source is supplied to the second load and not supplied to the first load; and a control unit that controls mode switching of the switching unit based on a state of the vehicle.

According to the power supply control device and the like of the present disclosure, since the power supply to the first load and the power supply to the second load do not occur at the same time, the overlap of inrush currents consumed by multiple loads can be suppressed in the backup power supply using the power of the second power supply source.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In a vehicle power supply control device according to the present disclosure, when the main power supply fails and it becomes necessary to perform backup power supply for a door unlock system and a brake system using a redundant power supply, the inrush current caused by the operation of the door unlock actuator and the inrush current caused by the operation of the brake actuator are kept from overlapping. This makes it possible to avoid a momentary drop in the output voltage due to the discharge of a large current from the redundant power supply.

Hereinafter, an embodiment of the present disclosure will be described in detail with reference to the drawings.

EMBODIMENT

Configuration

Figure 1:
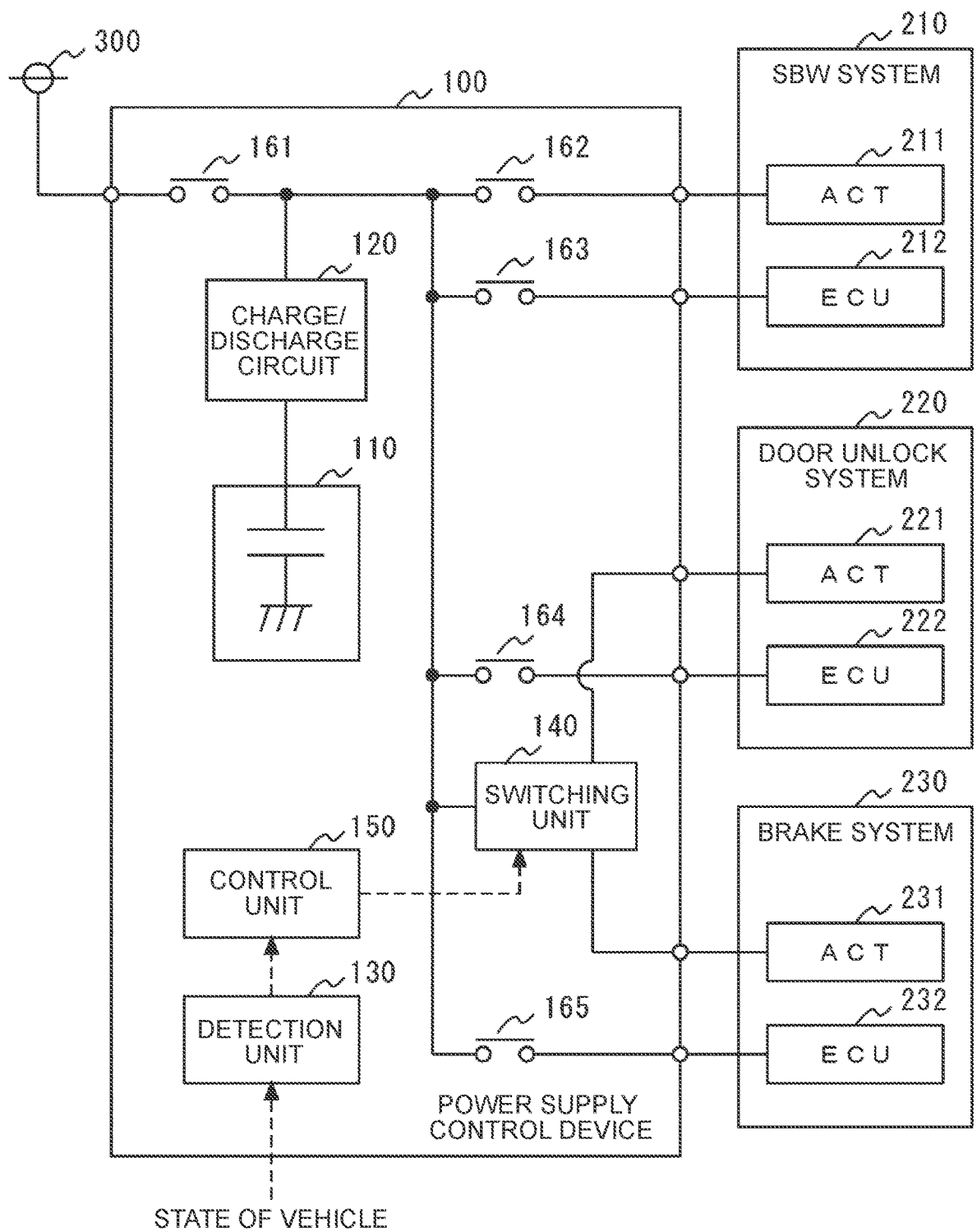
FIG. 1 is a functional block diagram of a power supply control device according to an embodiment of the present disclosure and its peripheral components.

FIG. 1 is a functional block diagram of a power supply control device 100 according to an embodiment of the present disclosure and peripheral components thereof. The functional blocks illustrated in FIG. 1 include a power supply control device 100, a plurality of systems including an SBW system 210, a door unlock system 220, and a brake system 230, and a first power supply source 300. The power supply control device 100, the SBW system 210, the door unlock system 220, the brake system 230, and the first power supply source 300 are mounted on a vehicle.

The first power supply source 300 is a main power supply (+B power supply) that supplies power to the SBW system 210, the door unlock system 220, and the brake system 230. As the first power supply source 300, predetermined power supply configurations can be exemplified such as a power generator including an alternator that generates power and a direct current-to-direct current (DC/DC) converter that converts the generated power into a predetermined voltage, or a rechargeable secondary battery (auxiliary battery) such as a lead storage battery.

The systems such as the SBW system 210, the door unlock system 220, and the brake system 230 are in-vehicle devices (in-vehicle loads) for realizing predetermined functions related to the vehicle, and particularly require a redundant power supply configuration. These systems are each connected and configured so as to be able to receive main power supply from the first power supply source 300 without the power supply control device 100 (not shown), and to receive backup power supply from the power supply control device 100 based on the first power supply source 300. The systems mounted on the vehicle are not limited to those shown in FIG. 1.

The SBW system 210 is a shift-by-wire (SBW) control device through which gear stages can be changed in a transmission (not shown) by electric signals. The SBW system 210 includes an SBW_ECU 212 that is an electronic control unit that converts the driver's shift operation into an electric signal, and an SBW_ACT 211 that is an actuator that changes the gear stages based on the electric signal instructed by the SBW_ECU 212. In the SBW_ACT 211, for example, a load current is generated at the timing of performing control to put the shift into the parking position when a vehicle door is opened.

The door unlock system 220 is a locking/unlocking control device that can lock/unlock a vehicle door with an electric signal. The door unlock system 220 includes a door unlock ECU 222 that is an electronic control unit that converts the driver's locking/unlocking operation into an electric signal, and a door unlock ACT 221 that is an actuator that changes the locked state and the unlocked state of the vehicle door based on the electric signal instructed by the door unlock ECU 222. In the door unlock ACT 221, for example, a load current is generated at the timing when a predetermined time (for example, 10 seconds) has passed since the occurrence of a collision of the vehicle.

The brake system 230 is a brake control device capable of generating a braking force on the vehicle. The brake system 230 includes a brake ECU 232 that is an electronic control unit that converts a driver's braking operation into an electric signal, and a brake ACT 231 that is an actuator that generates a braking force based on the electric signal instructed by the brake ECU 232. In the brake ACT 231, for example, a load current is generated at the timing when the driver inputs a brake operation after the failure of the main power supply.

The power supply control device 100 is a sub power supply (redundant power supply) for performing backup supply of power to the SBW system 210, the door unlock system 220, and the brake system 230 when an abnormality occurs in the power supply from the first power supply source 300 to the SBW system 210, the door unlock system 220, and the brake system 230 due to a power failure of the first power supply source 300.

The power supply control device 100 illustrated in FIG. 1 includes a second power supply source 110, a charge/discharge circuit 120, a detection unit 130, a switching unit 140, a control unit 150, and a plurality of relays 161 to 165.

The second power supply source 110 is, for example, a rechargeable secondary battery such as a lithium ion battery or a power storage element such as a capacitor. The second power supply source 110 is provided for backup of the first power supply source 300. The second power supply source 110 is connected to the charge/discharge circuit 120 so as to be able to charge the power of the first power supply source 300 and to discharge the power stored by itself to the SBW system 210, the door unlock system 220, and the brake system 230.

The charge/discharge circuit 120 is a circuit for inputting power from the first power supply source 300 via the relay 161 and outputting the power to the second power supply source 110. In addition, the charge/discharge circuit 120 is a circuit for inputting power from the second power supply source 110 and outputting the power to the SBW system 210, the door unlock system 220, and the brake system 230 via the relays 162 to 165 and the switching unit 140. A DC/DC converter, for example, can be used for the charge/discharge circuit 120. The charge/discharge circuit 120 can charge/discharge the second power supply source 110 based on an instruction from the control unit 150 or the like.

The detection unit 130 is configured to detect a predetermined state of the vehicle. The detection unit 130 detects, as a predetermined state of the vehicle, a state in which an abnormality (such as a power failure) occurs in the first power supply source 300 (first detection unit). Further, the detection unit 130 detects, as a predetermined state of the vehicle, a state in which a collision of the vehicle has occurred or a state in which the speed of the vehicle has decreased (second detection unit). When the detection unit 130 detects a predetermined state of the vehicle, it is notified to the control unit 150.

The switching unit 140 is configured to switch the state of power supply from the first power supply source 300 or the second power supply source 110 to the door unlock ACT 221 and the brake ACT 231. The switching unit 140 is provided with a "first mode" that is a state in which the power of the second power supply source 110 is supplied to the brake ACT 231 (first load) and not supplied to the door unlock ACT 221 (second load), and a "second mode" that is a state in which the power of the second power supply source 110 is supplied to the door unlock ACT 221 (second load) and not supplied to the brake ACT 231 (first load). The switching unit 140 can selectively switch between the first mode and the second mode based on an instruction from the control unit 150. The switching unit 140 may be configured by inserting, for example, a relay capable of switching between electrical conduction/interruption between the charge/discharge circuit 120 and the brake ACT 231 (first relay), and between the charge/discharge circuit 120 and the door unlock ACT 221 (second relay).

The control unit 150 is configured to control mode switching for switching the power supply state (first mode or second mode) in the switching unit 140 based on the state of the vehicle detected by the detection unit 130, and is a microcomputer, for example. The control unit 150 can also control the state of the charge/discharge circuit 120. In addition, the control unit 150 can control the conduction/interruption states of the plurality of relays 161 to 165. Details of the control performed by the control unit 150 will be described later.

The plurality of relays 161 to 165 is switch elements that can switch between electrical conduction/interruption states based on instructions from the control unit 150 or the like. The relay 161 has one terminal connected to the first power supply source 300 and the other terminal connected to the charge/discharge circuit 120. The relay 162 has one terminal connected to the charge/discharge circuit 120 and the other terminal connected to the SBW_ACT 211. The relay 163 has one terminal connected to the charge/discharge circuit 120 and the other terminal connected to the SBW_ECU 212. The relay 164 has one terminal connected to the charge/discharge circuit 120 and the other terminal connected to the door unlock ECU 222. The relay 165 has one terminal connected to the charge/discharge circuit 120 and the other terminal connected to the brake ECU 232. The number of the relays 161 to 165 is not limited to that shown in FIG. 1, and increases and decreases depending on the number of systems connected to the power supply control device 100.

A part or all of the configurations of the power supply control device 100 described above can typically be configured as an electronic control unit (ECU) including a processor, a memory, an input/output interface, and the like. The electronic control unit realizes a part or all of the functions of the charge/discharge circuit 120, the detection unit 130, the switching unit 140, and the control unit 150 described above as the processor reads and executes the program stored in the memory.

Control

Figure 2:
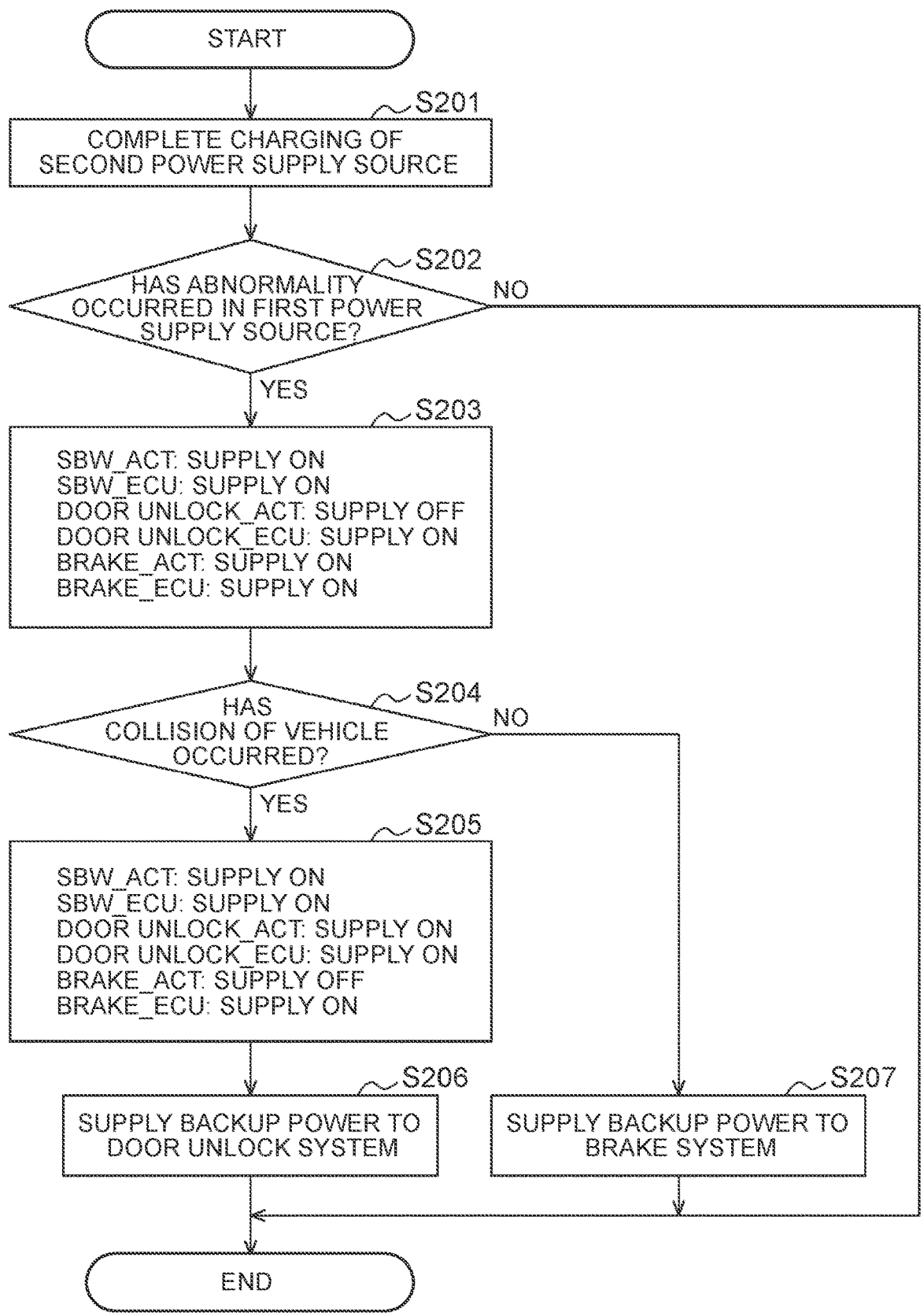
FIG. 2 is a process flowchart of a power supply control executed by the power supply control device.

Next, with further reference to FIG. 2, the control executed by the power supply control device 100 will be described. FIG. 2 is a flowchart illustrating the processing procedure of the power supply control executed by each component of the power supply control device 100. The power supply control shown in FIG. 2 is started, for example, when the ignition of the vehicle is turned on (IG-ON).

Step S201

The power supply control device 100 completes the necessary charging in the second power supply source 110. With this charging completion, backup power supply to the SBW system 210, the door unlock system 220, and the brake system 230 using the second power supply source 110 can be performed when an abnormality occurs in the first power supply source 300. When charging of the second power supply source 110 is completed, the process proceeds to step S202.

Step S202

The power supply control device 100 determines whether the detection unit 130 has detected that an abnormality has occurred in the first power supply source 300. An abnormality of the first power supply source 300 is a state in which power cannot be supplied from the first power supply source 300 to the SBW system 210, the door unlock system 220, and the brake system 230, such as a power failure or a ground fault. When an abnormality is detected in the first power supply source 300 (step S202: Yes), the process proceeds to step S203, and when an abnormality is not detected in the first power supply source 300 (step S202: No), this power supply control ends.

Step S203

The power supply control device 100 controls the backup power supply state to the SBW system 210, the door unlock system 220, and the brake system 230 by the switching unit 140 and the control unit 150. Specifically, the power supply control device 100 controls each of the SBW_ACT 211, the SBW_ECU 212, the door unlock ECU 222, the brake ACT 231, and the brake ECU 232 so that power can be supplied (conducted state), and controls only the door unlock ACT 221 to a state in which power cannot be supplied (interrupted state). That is, the switching unit 140 switches to the first mode.

The reason why the first mode is selected when there is an abnormality in the first power supply source 300 is that the vehicle is likely to be traveling when the abnormality occurs and priority should be given to quick response to brake operation by the driver rather than the unlock operation of the vehicle door in this situation. By setting the state in which power can be supplied to the first mode, for example, even if the brake operation and the door unlock operation are input at the same time, only the brake operation is accepted and the inrush currents of the two operations do not overlap. When the backup power supply state for the systems is controlled to the first mode, the process proceeds to step S204.

Step S204

The power supply control device 100 determines whether the detection unit 130 has detected that a collision of the vehicle has occurred. A collision of the vehicle is, for example, a rear-end collision or contact with a target such as a preceding vehicle, an oncoming vehicle, a traffic light, or a guardrail. When the occurrence of a collision of the vehicle is detected (step S204: Yes), the process proceeds to step S205, and when the occurrence of a collision of the vehicle is not detected (step S204: No), the process proceeds to step S207.

Step S205

The power supply control device 100 controls the backup power supply state to the SBW system 210, the door unlock system 220, and the brake system 230 by the switching unit 140 and the control unit 150. Specifically, the power supply control device 100 controls the SBW_ACT 211, the SBW_ECU 212, the door unlock ACT 221, the door unlock ECU 222, and the brake ECU 232 so that power can be supplied (conducted state), and controls only the brake ACT 231 to a state in which power cannot be supplied (interrupted state). That is, the switching unit 140 switches to the second mode.

The reason why the second mode is set in the event of a vehicle collision after the occurrence of an abnormality in the first power supply source 300 is that there is a high possibility that the speed of the vehicle has become extremely low or that the vehicle has stopped due to the collision, and in this situation, there is a low probability that the driver will operate the brakes and priority should be given to unlocking the vehicle doors for escape. By setting the state in which power can be supplied to the second mode, for example, even if the brake operation and the door unlock operation are input at the same time, only the door unlock operation is accepted and the inrush currents of the two operations do not overlap. When the backup power supply state to the systems is controlled to the second mode, the process proceeds to step S206.

Step S206

The power supply control device 100 supplies backup power from the second power supply source 110 to the door unlock system 220. At this time, backup power is also supplied from the second power supply source 110 to the SBW system 210 and the brake ECU 232. When backup power supply to the door unlock system 220 is performed, this power supply control ends.

Step S207

The power supply control device 100 supplies backup power from the second power supply source 110 to the brake system 230. At this time, backup power is also supplied from the second power supply source 110 to the SBW system 210 and the door unlock ECU 222. When backup power supply to the brake system 230 is performed, this power supply control ends.

It should be noted that the SBW_ACT 211 or other actuators may be used instead of the door unlock ACT 221 as an actuator for controlling the supply state of backup power. In this case, the order of switching between the first mode and the second mode that are switched according to the detection of a collision of the vehicle may be switched to be controlled.

Modification

Figure 3:
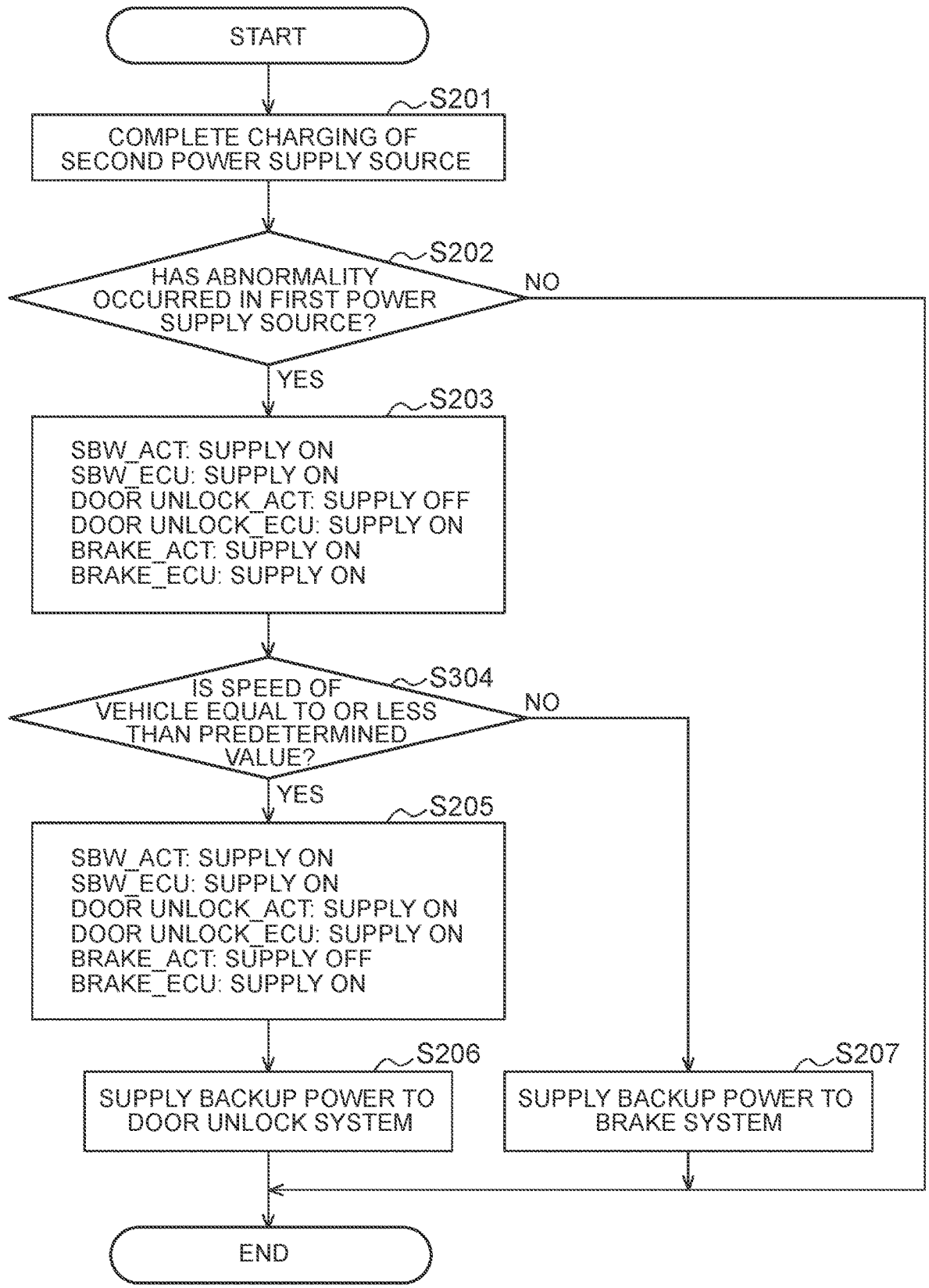
FIG. 3 is a process flowchart of a power supply control according to a modification executed by the power supply control device.

FIG. 3 is a flowchart illustrating a processing procedure of power supply control according to a modification executed by each component of the power supply control device 100. The power supply control of the modification shown in FIG. 3 replaces the process of step S204 of FIG. 2 with the process of step S304. Other processes in the power supply control of the modification is the same as the processes in the power supply control of FIG. 2, so a part of the description will be omitted.

When the backup power supply state to the SBW system 210, the door unlock system 220, and the brake system 230 is controlled to the first mode in step S203, the process proceeds to step S304.

Step S304

The power supply control device 100 determines whether the detection unit 130 has detected that the speed of the vehicle has decreased to a value equal to or less than a predetermined value. This determination is synonymous with the determination of a vehicle collision, so the predetermined value can be set to a value as small as possible (for example, less than 5 km/h) assuming that the speed of the vehicle will decrease due to the collision of the vehicle. When it is detected that the speed of the vehicle has become equal to or less than the predetermined value (step S304: Yes), the process proceeds to step S205, and when it is not detected that the speed of the vehicle has become equal to or less than the predetermined value (step S304: No), the process proceeds to step S207.

In step S205, the backup power supply state to the SBW system 210, the door unlock system 220, and the brake system 230 is controlled to the second mode. The reason why the second mode is set when the vehicle speed decreases after the occurrence of an abnormality in the first power supply source 300 is that, as in the case of the collision of the vehicle described above, in a situation where the speed of the vehicle has become extremely low or the vehicle has stopped, there is a low probability that the driver will operate the brakes and priority should be given to unlocking the vehicle doors for escape. Operations and Effects As described above, in the power supply control device 100 according to the embodiment of the present disclosure, when power is supplied from the second power supply source 110 (redundant power supply), which backs up the first power supply source 300 (main power supply), to the SBW system 210, the door unlock system 220, and the brake system 230, only one of the door unlock ACT 221 and the brake ACT 231 is controlled to a state in which backup power is not supplied based on a determination of a collision of the vehicle or a determination of a decrease in the vehicle speed.

With this control, even if the driver simultaneously instructs the brake operation and the door unlock operation, only either the brake operation or the door unlock operation is accepted. Thus, the inrush current due to the execution of the brake operation and the inrush current due to the execution of the door unlock operation are not overlapped, avoiding discharge from the second power supply source 110. Therefore, it is possible to suppress a momentary large drop in the output voltage of the second power supply source 110, and to avoid hindering the operation of the backup power supply from the second power supply source 110 (reset of the control microcomputer, etc.).

Moreover, since there is no need to increase the capacity of the capacitor or the like that is the second power supply source 110, it is possible to prevent an increase in the cost, weight, and size of the power supply control device 100. In addition, it is not necessary to take countermeasures such as setting the output voltage of the second power supply source 110 high in advance to prepare for a voltage drop, and deterioration of the life of the capacitor and the like can be suppressed.

Although one embodiment of the technique of the present disclosure has been described above, the present disclosure can be interpreted as a method executed by a power supply control device, a program of the method, a computer-readable non-transitory storage medium that stores the program, and a vehicle including the power supply control device, for example, in addition to the power supply control device.

The power supply control device of the present disclosure can be used as a backup integrated power supply for a vehicle having a power storage unit for supplying backup power to multiple systems (loads) such as SBW/door unlock/brake.

What is claimed is:

1. A power supply control device for a vehicle, the power supply control device configured to control power supply to a plurality of loads from a second power supply source provided for backup of a first power supply source, the power supply control device comprising:
   relays configured to switch between a first mode in which power of the second power supply source is supplied to a first load and not supplied to a second load, and a second mode in which the power of the second power supply source is supplied to the second load and not supplied to the first load; and
   a processor configured to:
      determine whether an abnormality in the first power supply source is detected while the vehicle is traveling;
      control the relays to obtain the first mode while the vehicle is traveling in response to determining that the abnormality in the first power supply source is detected;
      control the relays to switch from the first mode to the second mode while the vehicle is traveling based on a traveling state of the vehicle;
      determine whether a value of a speed of the vehicle as the traveling state of the vehicle is decreased to a predetermined value or lower during power supply in the first mode; and
      control the relays to switch from the first mode to the second mode in response to determining that the abnormality in the first power supply source is detected and the value of the speed of the vehicle is decreased to the predetermined value or lower.

2. The power supply control device according to claim 1, wherein
   the relays include a first relay provided between the second power supply source and the first load and a second relay provided between the second power supply source and the second load, and
   the processor is further configured to control conduction and interruption of the first relay and the second relay.

3. A power supply control device for a vehicle, the power supply control device configured to control power supply to a plurality of loads from a second power supply source provided for backup of a first power supply source, the power supply control device comprising:
   relays configured to switch between a first mode in which power of the second power supply source is supplied to a brake actuator of the vehicle and not supplied to a door unlock actuator of the vehicle, and a second mode in which the power of the second power supply source is supplied to the door unlock actuator of the vehicle and not supplied to the brake actuator of the vehicle; and
   a processor configured to:
      control the relays to switch between the first mode and the second mode based on a state of the vehicle;
      determine whether a value of a speed of the vehicle as a traveling state of the vehicle is decreased to a predetermined value or lower during power supply in the first mode; and
      control the relays to switch from the first mode to the second mode in response to determining that an abnormality in the first power supply source is detected and the value of the speed of the vehicle is decreased to the predetermined value or lower.

4. The power supply control device according to claim 1, wherein the first load is a brake actuator of the vehicle and the second load is a door unlock actuator of the vehicle.

5. The power supply control device according to claim 4, wherein power supply to the brake actuator and power supply to the door unlock actuator do not occur at the same time in each of the first mode and the second mode when a driver of the vehicle performs braking of the vehicle at the same time performing unlock of a door of the vehicle.

\* \* \* \* \*